United States Patent [19]
DeHart

[11] Patent Number: 6,073,336
[45] Date of Patent: Jun. 13, 2000

[54] METHOD FOR STATOR COIL LACING

[75] Inventor: Hobart DeHart, Austin, Ind.

[73] Assignee: Reliance Electric Technologies, LLC, Thousand Oaks, Calif.

[21] Appl. No.: 09/122,950

[22] Filed: Jul. 27, 1998

[51] Int. Cl.$^7$ .................................................. H02K 15/00
[52] U.S. Cl. ............................ 29/596; 29/598; 310/254; 310/261; 198/346; 198/465.1; 198/570
[58] Field of Search ....................... 29/596, 508; 310/71, 310/260, 261, 194, 254; 198/346.1, 346.2, 341.01, 341.02, 341.03, 465.1, 570, 349

[56] References Cited

U.S. PATENT DOCUMENTS

| | | |
|---|---|---|
| 3,685,470 | 8/1972 | Frederick . |
| 3,824,940 | 7/1974 | Habegger et al. ............... 112/121.2 X |
| 4,318,022 | 3/1982 | Miller ....................................... 310/260 |
| 4,614,161 | 9/1986 | Frederick . |
| 4,642,497 | 2/1987 | Boyd, Jr. ........................... 310/68 R X |
| 4,648,176 | 3/1987 | Moser .................................... 29/596 X |
| 4,723,354 | 2/1988 | Moser .................................... 29/596 X |
| 4,815,673 | 3/1989 | Wheeler .................................. 242/7.09 |
| 5,485,670 | 1/1996 | Bouman et al. . |
| 5,511,502 | 4/1996 | Moiser et al. ...................... 112/470.21 |
| 5,615,472 | 4/1997 | Bouman et al. . |

Primary Examiner—Lee Young
Assistant Examiner—Binh-An Nguyen
Attorney, Agent, or Firm—Himanshu S. Amin; John J. Horn; A. M. Gerasimow

[57] ABSTRACT

A method and apparatus for lacing stator coil windings and leads is provided. Lacing of the stator coil windings and leads is performed during an automated process which occurs while the stator is situated on a pallet which is moved by a conveyer belt through a manufacturing facility. The pallet includes an inner ring and an outer ring rotatably disposed therein. The inner ring supports the stator and allows the stator to be rotated during lacing. The outer ring is rotated at the same rotational speed and direction as the inner ring and includes a plurality of clips for releasably securing leads of the stator. The pallet further includes a lead lift assembly which is movable in a substantially vertical direction. Upon introduction of the pallet to a lacing station in the manufacturing facility, a vertical positioning device engages the lead lift assembly from beneath the pallet and raises the assembly to a predetermined height. Further, a drive gear engages the outer ring and serves to rotate the outer and inner ring according to a predefined lacing protocol. During lacing, the lead lift assembly positions the leads of the stator such that the leads are laced in a desired manner.

15 Claims, 6 Drawing Sheets

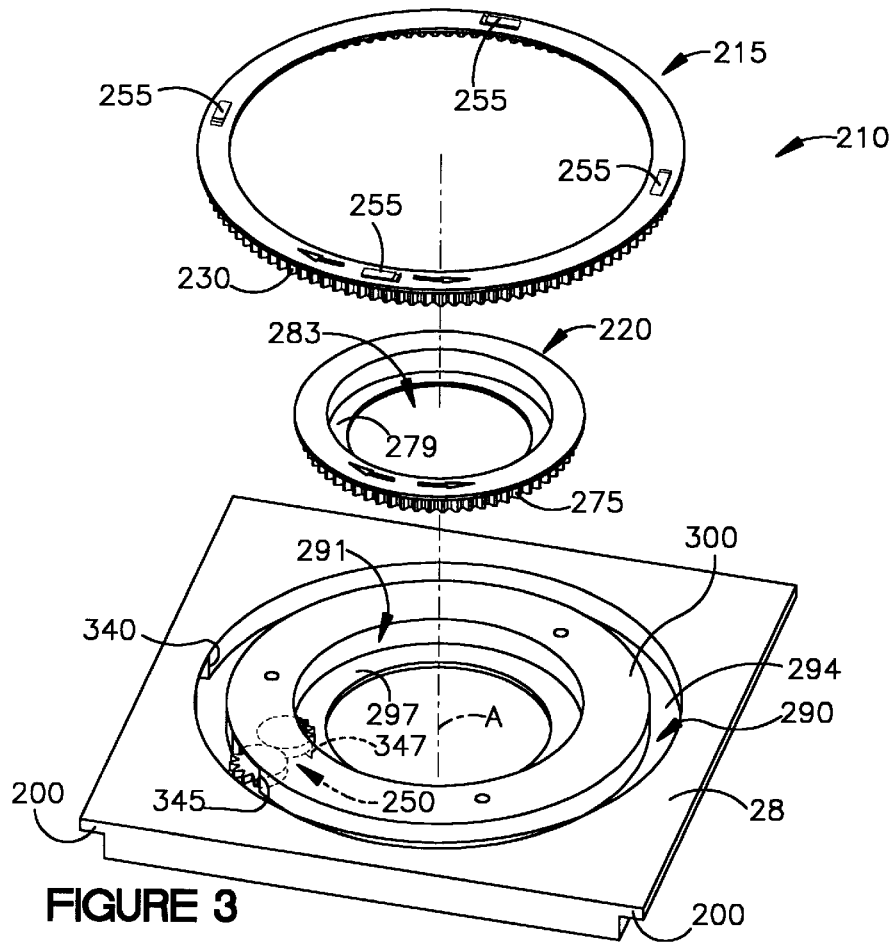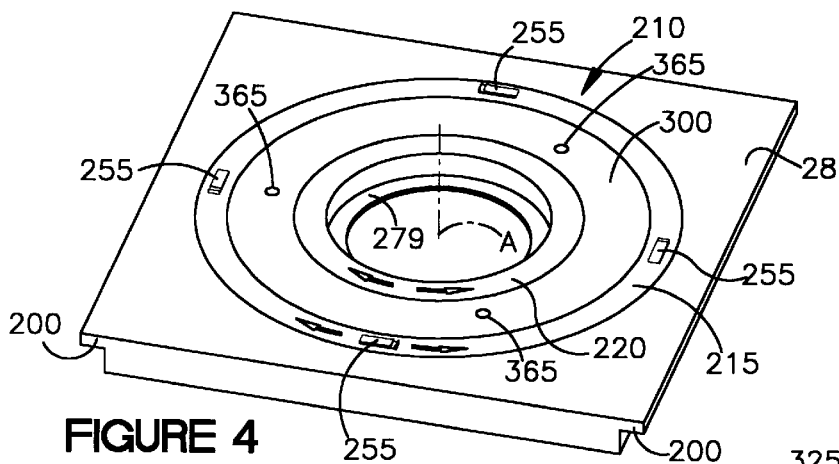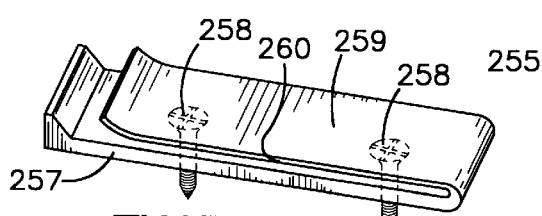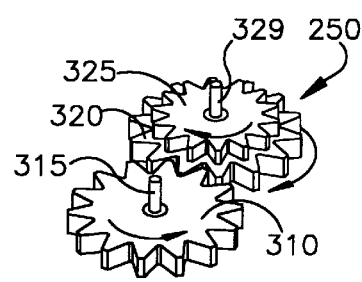

METHOD FOR STATOR COIL LACING

TECHNICAL FIELD

The present invention relates to a stator coil lacing device for lacing end windings and lead cords of an electrodynamic machine. More particularly, the present invention relates to a stator coil lacing device having lacing capabilities which eliminate the need for an arbor and provide for automated lead cord positioning.

BACKGROUND OF THE INVENTION

Induction motors typically include a stator and a rotor. The stator includes a metallic core with a plurality of coils or windings running through the core. An alternating current is passed through these coils to generate an alternating magnetic flux field. The rotor includes a plurality of coils or windings in which an alternating current is induced by the alternating magnetic flux field of the stator. The end coils or end turns of the stator are grouped together at axial ends of the stator and are laced or stitched together to prevent interference with other components of a device. The end turns may be coated with an epoxy or resin subsequent to stitching. This coating helps to reduce movement of the wires and provides an insulated barrier between the wires and other objects. Lacing in this case helps assure that the coils are tightly grouped together prior to coating.

During manufacture, each stator typically is placed on a pallet which is moved by a conveyer belt through the manufacturing facility. As part of the manufacturing process, each stator is introduced to a station at which lacing thereof occurs. Use of a stator coil lacing machine avoids many of the manual operations otherwise necessary for lacing or stitching stator end coils and thus reduces labor costs and increases productivity and quality. At the lacing station, an operator typically lifts the stator and places the stator on the lacing machine. The lacing machine generally includes a worktable having a cylindrical arbor protruding upward from a central portion of the worktable. The arbor serves to ensure proper placement of the stator on the lacing machine and aids in rotating the stator as lacing takes place. Once lacing is completed, the stator is lifted off the arbor and removed from the lacing machine to be placed back on the pallet. The larger the longitudinal length of the arbor, the more effort is required to place the stator thereon and remove the stator there from. Insertion and removal is especially difficult given the oftentimes heavy weight of the stator which includes a heavy metallic core. While use of a lacing machine provides advantages in lacing the stator coils, the need physically to move the stator from the conveyer belt pallet to the lacing machine and back again to the pallet is a tedious process which impedes the overall manufacturing process.

One characteristic of some stator coil lacing machines is that the leads of the stator coil windings must be manually held and moved during lacing of the coils of the stator. Typically, a stator includes several groups of leads for supplying power and other signals to the stator. The leads must be held and moved in order appropriately to position the leads with respect to one or more lacing needles of the stator coil lacing machine. Oftentimes the leads are manually moved and positioned such that a portion of each lead is stitched to the coil in a desired manner. This allows the leads to extend from the stator at a desired location rather than loosely falling at random positions. The desired location from which the leads extend may be caused to correspond to openings in the stator housing which provide the leads with access outside the housing. Thus, one or both of the hands of the operator of a stator coil lacing machine is/are often preoccupied in positioning the leads during lacing of the coils of the stator. This has the disadvantages of preventing the operator from performing other tasks during stator coil lacing and thus lowers his or her productivity. In addition, an operator needs to be cautious so as to not carelessly come in contact with moving components of the stator coil lacing machine such as the lacing needles.

Therefore, there is a need in the art to reduce the amount of manual intervention needed during lacing of stator coil windings so as to mitigate the aforementioned shortfalls of conventional methods and devices.

SUMMARY OF THE INVENTION

Briefly, the present invention provides for automatically lacing of stator coil windings. Lacing of the stator coil windings and leads is performed while the stator is situated on a support such as a pallet which is moved through a manufacturing facility, for example, via a conveyer. According to an aspect of the invention, lacing of the stator occurs directly on the pallet and therefore it is not necessary for an operator to lift the stator off the pallet and place the stator over an arbor of a separate lacing machine in order to lace the end windings and leads. Furthermore, according to an aspect of the invention, the automated lacing process provides for automatically lacing the end windings and leads of the stator according to a predefined lacing protocol to provide for the leads to extend from the end windings at one or more desired locations without the need for an operator to manually guide the leads during lacing. Thus, the operator is free to perform other functions during the lacing process thereby increasing overall efficiency, and manual intervention by the operator during the lacing operation is substantially mitigated as compared to conventional lacing operations.

According to an aspect of the invention, in a manufacturing facility, a conveyer moves a plurality of stators from one station to the next in order to complete a manufacturing cycle. Each stator is placed on a respective pallet which moves with the conveyer. Preferably, each pallet includes a ring assembly for assisting in the lacing of stator coil windings and leads at a lacing station. The ring assembly is rotatably disposed in the pallet to rotate the stator during the lacing procedure. A slidable gear assembly situated at the lacing station engages with each ring assembly disposed in a pallet introduced to the lacing station and rotates the ring assembly according to a lacing protocol.

According to one particular aspect of the present invention a manufacturing facility includes a conveyer system and a plurality of supports coupled to the conveyer system for movement of the supports to a plurality of stations in the manufacturing facility. A stator is positioned on one of the plurality of supports at a first station and is moved by way of a conveyer system to a second station. At the second station end windings and/or leads of the stator are laced while the stator remains on the support.

According to another aspect of the present invention, a method of lacing the end windings and/or leads of a stator situated on a pallet which has a first ring rotatably disposed within the pallet, includes the steps of placing the stator on the first ring of the pallet, rotating the first ring according a predetermined lacing protocol, and lacing the end windings and/or the leads during at least a portion of the rotation of the first ring.

According to still another aspect of the present invention, a pallet which is useful in a manufacturing facility in which a conveyer system moves the pallet between a plurality of stations includes a base portion, a rotating means disposed in the base portion for rotatably supporting a stator, and a lead cord positioning means movably coupled to the base portion, the lead cord positioning means movable in a substantially vertical direction.

According to yet another aspect of the present invention a stator is produced by the process of positioning the stator on a pallet at a first station in a manufacturing facility, moving the pallet to a second station in the manufacturing facility by way of a conveyer system, and lacing end windings and/or leads of the stator positioned on the pallet at the second station.

According to yet still another aspect of the present invention, a system for lacing at least one of end windings and leads of a stator includes a pallet for supporting the stator. The pallet includes a means for lifting the leads, and a means for rotating the stator. The system further include a means for lacing the at least one of end windings and leads of the stator.

According to still another aspect of the present invention a system for lacing at least one of end windings and leads of a stator includes a pallet for supporting the stator, the pallet includes a base portion, a first and second ring rotatably disposed in the base portion, a means for rotating the first and second rings at substantially the same rotational rate, and a means for lifting the leads, the means for lifting movably supported by the base potion between the first and second rings. The system further includes a conveyer system for supporting the pallet and moving the pallet between a plurality of stations, and a means for lacing the at least one of end windings and leads of the stator disposed at one of the plurality of stations.

According to still another aspect of the present invention, a device for lacing at least one of end windings and leads of a stator includes a bobbin, a lacing needle, means for supporting the bobbin and the lacing needle with respect to one another for lacing the at least one of the end windings and leads, and means for vertically positioning the bobbin into and out of a cavity defined by the end windings.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

BRIEF DESCRIPTION OF THE DRAWING

In the annexed drawings:

FIG. 3 is an exploded perspective view of the pallet;

FIG. 4 is a perspective view of the pallet;

FIG. 5 is a perspective view of a clip used in conjunction with the pallet;

FIG. 6 is a perspective view of a gear assembly used in the pallet;

DETAILED DESCRIPTION OF THE INVENTION

Figure 1A:
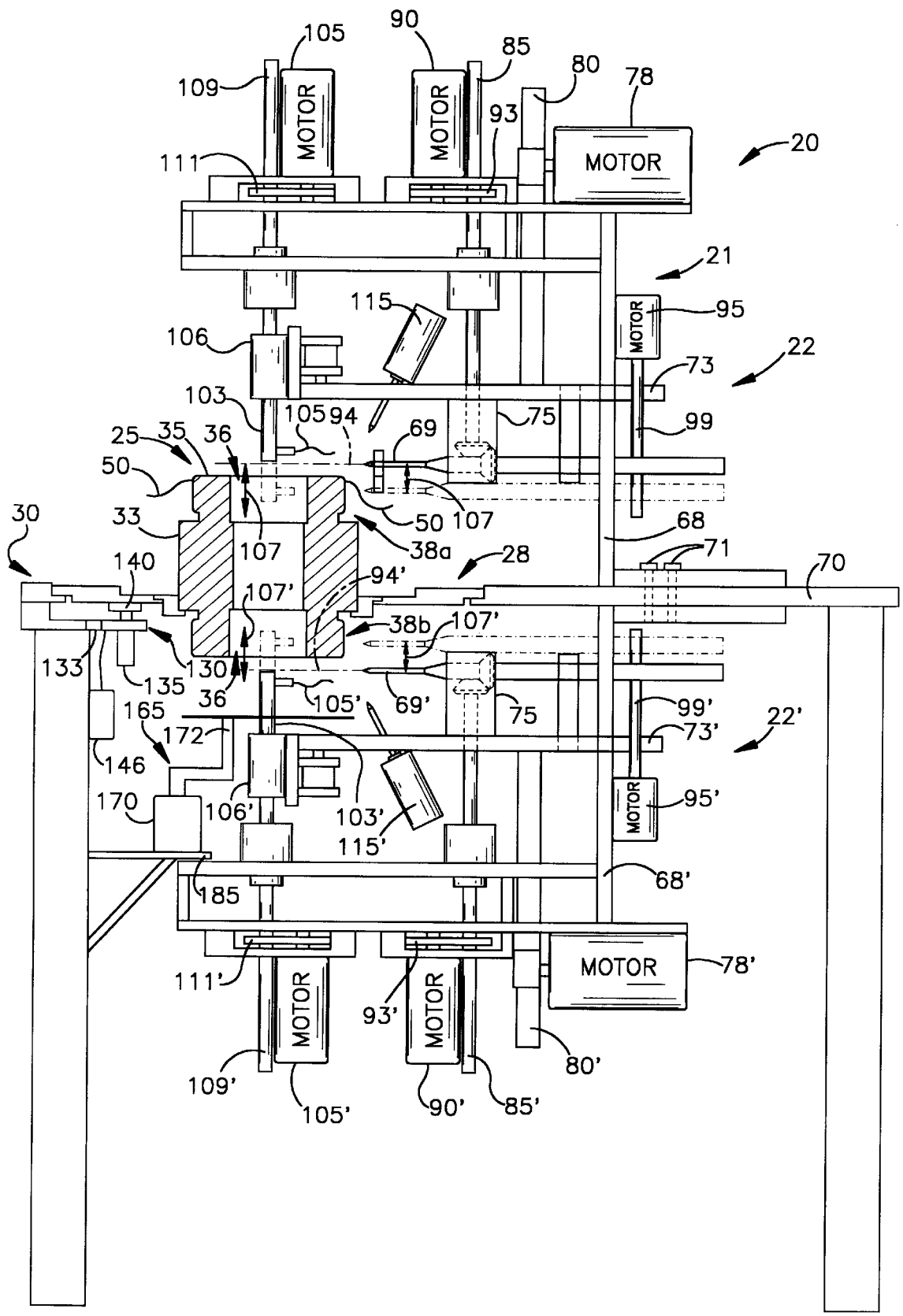
FIG. 1a is a side elevation view partly in section of a stator introduced to a lacing station in accordance with the present invention.

The present invention will now be described with reference to the drawings in which like reference numerals are used to refer to like elements throughout.

Figure 1B:
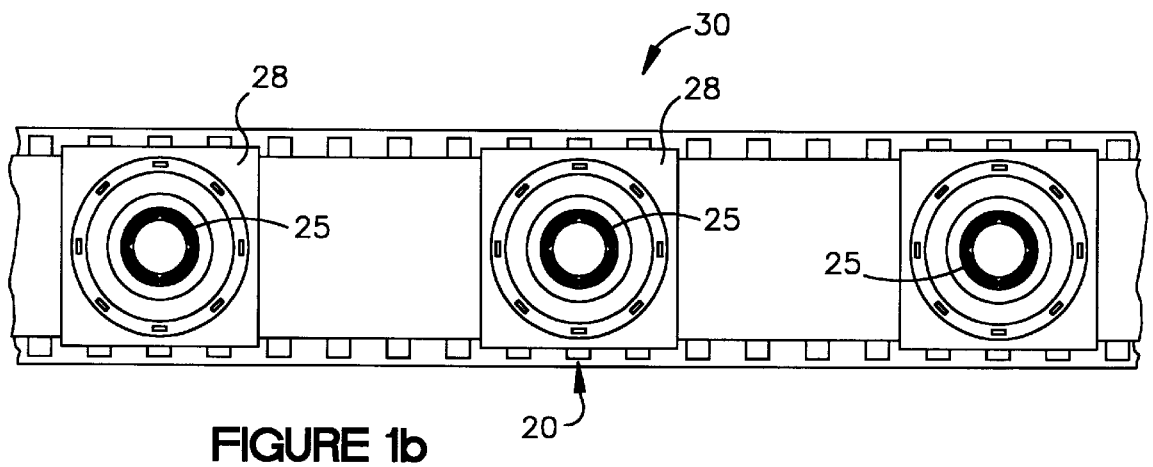
FIG. 1b is a top view of a conveyer system in accordance with the present invention.
Figure 2:
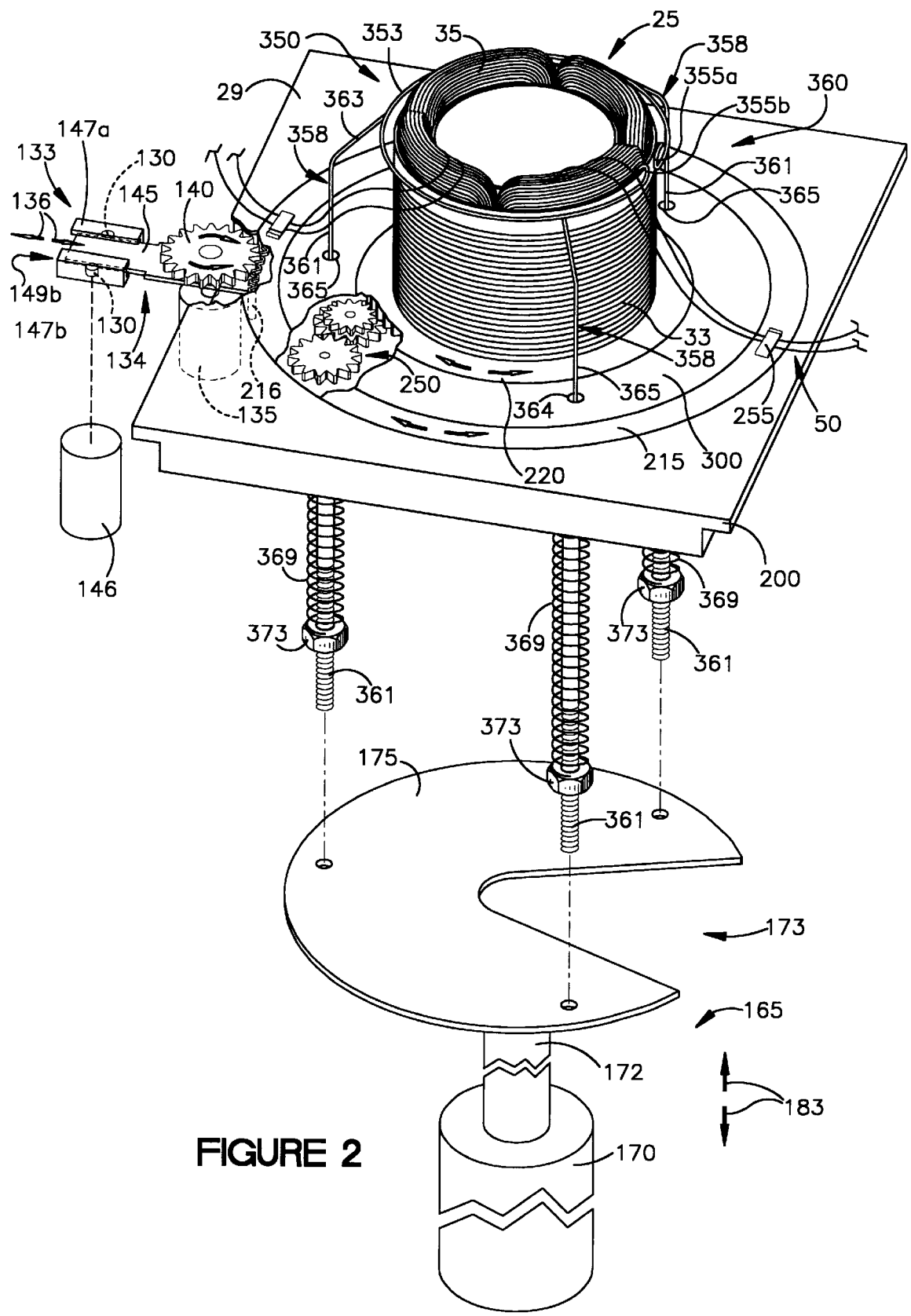
FIG. 2 is a partly exploded front view partly in perspective of the stator situated on a pallet at the lacing station.

Turning now to FIGS. 1a, 1b and 2, a stator coil lacing station 20 in accordance with the present invention is depicted. The stator coil lacing station 20 includes a lacing machine, apparatus or system 21 which may be separate or may be a portion of a stator manufacturing facility used to manufacture stators 20. As is illustrated in FIGS. 1a, 1b and 2, the stator 25 is situated on a pallet 28 of a conveyer system 30 and is introduced to the stator coil lacing station 20 as part of a stator manufacturing process as described in more detail below. The stator 25 includes a metal core 33, for example, formed from stacked laminations and includes conducting wires oriented axially through the metal core 33. The conducting wires are grouped together into end coils or end windings 35 which converge into a generally toroidal shape configuration at upper and lower ends 38a, 38b, respectively, of the metal core 33 and define a respective cavity 36 at each end 38a, 38b. Leads 50 extend from the end windings 35 situated on the upper end 38a of the metal core 33 and are used to provide the stator 25 with electrical control and power signals as is known in the art. For example, the leads 50 may provide the stator 25 with three phase power, thermal relay signals, etc. While the present embodiment depicts only two sets of leads 50 extending from the end windings 35, it will be appreciated that the stator 25 may include any number of sets of leads 50 depending on the operational requirements of the stator 25. As will be described in more detail below, a portion of the leads 50 are stitched to end windings 35 at the lacing station 20 such that each set of leads 50 extends from the end windings at one or more desired locations.

As best seen in FIG. 1a, the lacing station 20 includes the lacing machine 21 for lacing the end windings 35 and leads 50 of the stator 25. The lacing machine 21 includes an upper lacing section 22 and a lower lacing section 22'. Both the upper lacing section 22 and the lower lacing section 22' include corresponding components for lacing of the upper portion 38a, and lower portion 38b of the end windings 35, respectively. Thus, components of the lower lacing section 22' which correspond to components of the upper lacing section 22 are identified with the same reference numeral but with a prime "'". For sake of brevity, the following description will discuss only the components of the upper lacing section 22, however, it will be appreciated that the components of the lower lacing section 22' are similarly connected and configured as shown in FIG. 1a.

The upper lacing section 22 is mounted to a frame 68 which is secured to a lacing table 70 using mounting bolts 71 or other conventional securing techniques such as screws, adhesives, etc. The lacing machine 21 includes a positionable lacing needle 69 for lacing of the end windings 35 on the upper end 38a of the metal core 33. The lacing needle 69 is secured to vertical movement platform 73 of the frame structure 68 via needle housing 75. The platform 73 is coupled to vertical movement motor 78 via support rod 80. The vertical movement motor 78 serves to raise and to lower the platform 73 thereby allowing for vertical positioning of the lacing needle 69. Rotational positioning of the lacing needle 69 is accomplished by rotation rod 85 and rotation motor 90. More particularly, rotation rod 85 connects at one end to rotation motor 90 via gear assembly 93 and at the other end to lacing needle 69. Thus, upon operation of the rotation motor 90, the rotation rod 85 causes the lacing needle 69 to rotate about an axis 94 to a desired position for lacing of the end windings 35. The lacing needle 69 is also coupled to threading motor 95 via threading rod 99. The threading motor 95 and threading rod 99 provide the lacing needle 69 with in/out movement in a direction substantially parallel to axis 94 of the lacing needle 69.

The lacing machine 21 further includes a bobbin 103 for providing and directing a lacing cord 105 to an appropriate position with respect to the coil windings 35 to allow lacing to take place. A rotational direction of the bobbin 103 is controlled by bobbin motor 105 via bobbin control rod 109. The bobbin control rod 109 couples to the bobbin motor 105 via gear assembly 111 which rotates the bobbin control rod 109 in response to operation of the bobbin motor 105. Similar to the lacing needle 69, vertical positioning of the bobbin 103 is achieved by way of the vertical movement motor 78 appropriately positioning the platform 73 to which the bobbin 103 is secured. More particularly, as shown in phantom in FIG. 1a, the vertical movement motor 78 allows both the bobbin 103 and lacing needle 69 to be positioned above or below the upper end 38a of the stator coil end windings 35 during lacing as indicated by arrows 107. Thus, for example, the bobbin 103 may be positioned inside or outside a cavity defined by the end winding 35. It will be appreciated that while the present embodiment shows the vertical positioning of the bobbin 103 and lacing needle 69 to be controlled by the same motor 78, a separate stepper motor or other device could additionally or alternatively be coupled to each to allow for individual vertical positioning of the bobbin 103 and lacing needle 69.

Also secured to the frame 68 is threading assembly 115. The threading assembly 115 is secured to the platform 73 and moves in conjunction with the vertical positioning of the platform 73 as controlled by vertical movement motor 78. The threading assembly 115 includes a clamp (not shown) for securing the lacing cord 105 during certain portions of the lacing cycle and includes a shear (not shown) for cutting the lacing cord 105 as needed during the lacing cycle. Interaction between the bobbin 103, lacing needle 69, and threading assembly 115 is generally known in the art and is therefore not discussed in greater detail for sake of brevity.

Referring now also to FIG. 2, the lacing station 20 includes a slidable gear assembly 130 which is coupled to lacing table 70 via track 133. The slidable gear assembly 130 includes a bidirectional motor 135 coupled to drive gear 140 and is capable of rotating the drive gear 140 in both a clockwise and counter clockwise direction. A traction plate 145 is rigidly attached to the top of the bidirectional motor 135 and interfaces with the track 133 to allow the slidable gear assembly 130 to move horizontally in a direction depicted by arrows 136. A pair of traction wheels 134 secured to the traction plate 145 provide for movement of the slidable gear assembly 130 within track 133. The track 133 includes first and second track members 147a and 147b each mounted to the lacing table 70 using conventional mounting means and each defining a respective groove 149a and 149b, for receiving the traction plate 145 and traction wheels 134 of the slidable gear assembly 130. A motor 146 (FIG. 1a), attached to a side of the lacing table 70, provides motive force to the traction wheels 134 of the slidable gear assembly 130 for movement along the track 133.

Also included at the lacing station 20 is a vertical positioning device 165 (FIG. 2). The vertical positioning device 165 is used to aid in placement of the leads 50 during lacing as discussed in more detail below. The vertical positioning device 165 includes a stepper motor 170 having a lift member 172 extending therefrom and a lead lift plate 175. The lead lift plate 175 is rigidly secured to a top of the lift member 172 and includes a pie shaped groove 173 for providing room for the bobbin 103' and lacing needle 69' to interface with the end windings 35 on the lower end 35b of the stator 25 during lacing. The stepper motor 170 provides for movement of the lead lift plate 175 in substantially a vertical direction as depicted by arrows 183. The stepper motor 170 is situated on platform 185 (FIG. 1a) which is secured to the lacing table 70 using conventional techniques.

Turning now to FIGS. 2–4, the pallet 28 is described in more detail. The pallet 28 includes the base portion 29 which is generally rectangular in shape and includes a pair of flanges 200 suitable for situating the pallet 28 on the conveyer system 30 (FIG. 1b) for movement through the manufacturing facility. To provide for automatic lacing of the stator coil end windings 35 and leads 50 at the lacing station 20, the pallet 28 further includes a ring assembly 210 disposed therein. More particularly, the ring assembly 210 includes an outer ring 215 and an inner ring 220.

As best seen in FIG. 3, the outer ring 210 includes inner and outer gear teeth 225, 230, respectively. The outer gear teeth 230 have a pitch angle and spacing which is suitable to engage with drive gear 140 (FIG. 2). The inner gear teeth 225 have a pitch angle and spacing which is suitable for engaging with gear assembly 250. The outer ring further includes lead clips 255 connected thereto. As will be discussed in more detail below, the lead clips 255 aid in positioning leads 50 during lacing at the lacing station 20.

The lead clips 255, which are best seen in FIG. 5, include a base portion 257 and a cord securing member 259. The base portion 257 is secured to a top surface of the outer ring 215 using flat head screws 258 or the like. The securing member 259 is folded across a top surface 260 of the base portion 257 and provides a downward force against the top surface 260 for releasably securing items therebetween. It will be appreciated that while the present embodiment describes clips 255 attached to the outer ring 215 for securing the leads 50, other fasteners or securing devices may alternatively be used.

Returning again to FIG. 3, the inner ring 220 includes outer gear teeth 275 disposed about a periphery of the inner ring 220. The outer gear teeth 275 have a pitch angle and spacing configured to interface with gear assembly 250. The inner ring 220 includes a recessed step 279 which is a size to receive the metal core 33 of the stator 25. The recessed step 279 provides for mitigating wobbling and/or falling of the stator 25 situated therein during manufacture. Furthermore, an opening 283 in a central portion of the inner ring 220 provides space for the end windings 35 on the lower end 38b (FIG. 2a) of the stator core 33 to extend to an underside of the pallet 28 so that the end windings 35 are accessible for lacing or other manufacturing steps.

Both outer ring 215 and inner ring 220 are rotatably disposed in the pallet 28 to aid in lacing of the stator end windings 35 and leads 50. More particularly, the outer ring 215 is disposed in an outer ring receiving channel 290 in the pallet 28. A bottom surface 294 of the outer ring receiving channel 290 includes a brass bushing (not shown) to facilitate rotation of the outer ring 215 within channel 290. The inner ring 220 is situated within an inner receiving groove 291 which includes inner ring receiving ledge 297.

Similar to the outer ring receiving channel 290, the inner ring receiving ledge 297 includes a brass bushing to facilitate rotation of the inner ring 220 during operation. It will be appreciated that ball bearings and/or other devices may be used in place of the brass bushings to aid in rotation of the inner ring 220 and outer ring 215.

The outer receiving channel 290 and inner receiving groove 291 define a stationary middle ring 300. The gear assembly 250 allows for synchronized movement of the outer ring 215 and inner ring 220, and is connected to an underside of middle ring 300.

As best seen in FIG. 6, the gear assembly 250 includes three gears. A first gear 310 is coupled to the underside of the middle ring 300 via gear axle 315 and interfaces with the inner gear teeth 225 of the outer ring 215. Second and third gears 320 and 325, respectively, are rigidly attached to one another and are coupled to the underside of the middle ring 300 via gear axle 329. The pitch angle and spacing of the second gear is configured to interface with the gear teeth of the first gear 310. The pitch angle and spacing of the third gear 325 is configured to interface with the outer gear teeth 275 of inner ring 220. The third gear 325 also is configured to provide for both the outer ring 215 and inner ring 220 to move at the same angular rotation about central axis "A" of the pallet 28 during lacing.

In the present exemplary embodiment the outer ring 215 has ten times the number of gear teeth 230 as the drive gear 140. Thus, for example, if the drive gear 140 were to rotate at a speed of ten revolutions per minute, the outer ring 215 would rotate at a speed of one revolution per minute. As the outer ring 215 is rotated, the first gear 310 of the gear assembly 250 is correspondingly rotated via the inner gear teeth 225 of the outer ring 215. The first gear 310, in turn, engages rotation of both the second gear 320 and third gear 325. Finally, the third gear 325 engages rotation of the inner ring 220 via outer gear teeth 275. In order to ensure that the inner ring 220 is rotated at the same rotational speed as the outer ring 215, the third gear 325 is specifically configured to have an appropriate number of gear teeth to provide for equal rotational speed. For example, if the first and second gears 315 and 320 are rotated at the same rotational speed as the drive gear 140, then the third gear 325 would preferably be configured to have one-tenth the number of gear teeth as the inner ring 220 thereby ensuring the outer ring 215 and inner ring 220 rotate at the same speed.

Returning to FIG. 3, the pallet 28 further includes gear engaging apertures 340, 345 and 347 to allow for interaction between the drive gear 140 and outer ring 215, and between the outer ring 215 and the inner ring 220 via gear assembly 250. More particularly, the outer gear engaging aperture 340 is defined along a periphery of the outer ring channel 290 and is sized to allow the drive gear 140 to engage with the outer gear teeth 230 of the outer ring 215. Furthermore, inner and outer gear assembly apertures 345 and 347, respectively, are defined along an inner and outer periphery of the middle ring 300 and are each sized to allow the gear assembly 250 to engage with the outer ring 215 and inner ring 220.

Referring back to FIG. 2, each pallet 28 further includes a lead lift assembly 350 for guiding the leads 50 to a desired position along end windings 35 during lacing. The lead lift assembly 350 includes ring portion 353 having a diameter just slightly larger than a diameter of the metal core 35 of the stator 25 such that the ring portion 353 may be freely lifted and lowered about the metal core 35. The ring portion 353 further includes a pair of hooks 355a, 355b which define a stitch window 360 through which lacing needle 69 reaches the end windings 35 during lacing. The ring portion 353 is movably secured to the pallet 28 via three lead lift legs 358. Each leg 358 includes a vertical section 361 and an angled section 363. Each angled section 363 is rigidly coupled to the ring portion 353 and is angled sufficiently to position the ring portion 353 about the metal core 35. Each vertical section 361 passes through a corresponding lead lift aperture 365 in the middle ring 300 of the pallet 28. A spring 369 is secured to a distal end of each vertical section 361 using a lock nut 373. An opposite end of the spring 369 abuts an underside of the middle ring 300. The spring 369 provides a downward force on the lead lift assembly 350 to ensure that the lead lift assembly is lowered following a lacing procedure as discussed in more detail below. Of course, other means for aiding in lowering the lead lift assembly 350 such as placing weights on the distal end of the vertical section 361 alternatively may be used.

In operation, the present invention provides for an automated stator lacing process which minimizes the amount of operator intervention needed to lace the end windings 35 and leads 50 of the stator 25. More particularly, lacing of the end windings 35 and leads 50 is performed during an automated process which occurs while the stator 25 is situated on the pallet 28 during a manufacturing cycle. Thus, it is not necessary for an operator to lift the stator 25 from the pallet 28 and to place the stator 25 over an arbor of a separate lacing machine. Furthermore, the automated lacing process automatically laces the end windings 35 and leads 50 of the stator 25 according to a predefined lacing pattern to ensure that the leads 50 extend from the end windings 35 at one or more desired locations without the need for an operator to manually guide the leads 50 during lacing.

The stator 25 is placed on pallet 28 at a first station of a stator manufacturing facility at the start of a manufacturing process and is moved by the conveyer system 30 from one station to the next. In order to stabilize the stator 25 from movement, the metal core 33 is placed on the recessed step 279 of the inner ring 220. Additionally, in order to ensure that the stator 25 is not inadvertently rotated or moved by the inner ring 220 upon which the stator 25 is situated, both the inner ring 220 and outer ring 215 are secured from rotational movement using spring loaded locking pin 216 (FIG. 2). The locking pin 216 is movably mounted to a lower portion of the platform 28 adjacent an area where the slidable gear assembly 140 engages with the outer ring 215. A spring (not shown) associated with the locking pin 216 provides sufficient force to engage the locking pin 216 between a pair of gear teeth on the outer ring 215 when the slidable gear assembly 140 is not engaged. When the slidable gear assembly 130 is engaged, the traction plate 145 of the slidable gear assembly 130 engages with the locking pin 216 so as to move the locking pin 216 away from the gear teeth on the outer ring 215 thereby allowing for rotation of the inner ring 220 and outer ring 215 by the drive gear 140.

Referring now to FIGS. 1a, 1b, and 2, upon introduction of pallet 28 to the lacing station 20, the motor 146 provides motive force to the traction plate 145 to move the slidable gear assembly 130 towards the pallet 28 until the drive gear 140 engages with the outer gear teeth 230 of the outer ring 215. Once engaged, the locking pin 216 unlocks the outer ring 215 and inner ring 220 such that each may rotate about central axis A. Prior to lacing, the lacing needle 69 is automatically positioned to a predetermined position adjacent the stitch window 360 using motors 90 and 78. Of course, an operator may adjust the placement of the lacing needle 69 via an operator control panel (not shown) if desired.

Referring now to FIGS. 7a–7f, an exemplary embodiment of the present invention is shown in which lacing of the end windings 35 and leads 50 occurs such that the leads 50 ultimately extend from the end windings 35 at two points spaced 180° apart from one another. It will be appreciated that while FIGS. 7a–7f primarily focus on the end windings 35 on the upper end 38a (FIG. 1a) of the metal core 33, the end windings 35 on the lower end 38b of the metal core 33 are laced similarly by the lacing machine 21. Starting with FIG. 7a, stator 25 is shown situated on pallet 28 just prior to the beginning of a lacing process at lacing station 20. In this particular embodiment there is shown two sets of leads 50, however, it will be appreciated that the stator 25 may include any number of sets of leads 50.

Figure 7A:
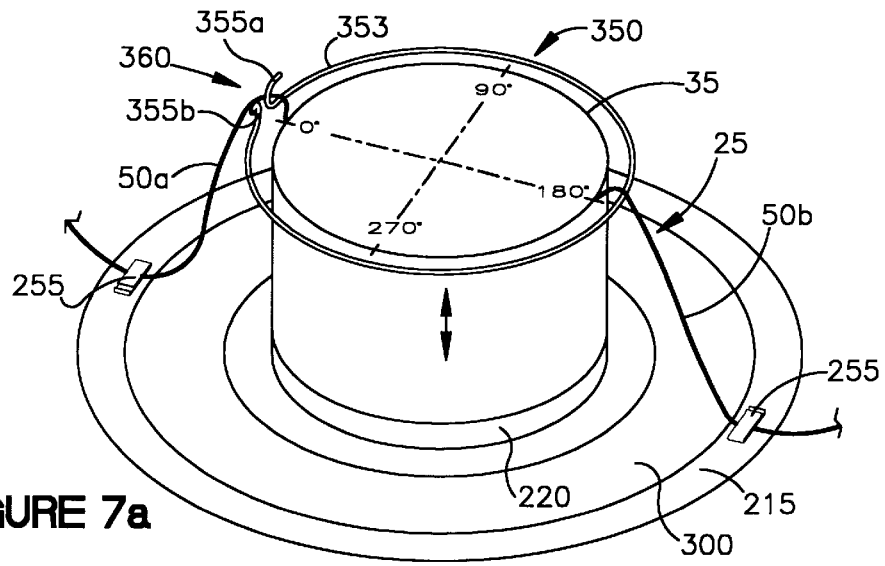
FIG. 7a is a perspective view of the stator at the start of a lacing process.

As discussed above, each of the sets of leads 50 is pre-clipped to a corresponding clip 255 on the outer ring 215. The clips 255 provide tension to the leads 50 while still allowing the leads 50 to be pulled through the clip 255 when taken up during the lacing process. In order to ensure proper placement of the leads 50 during lacing, the vertical positioning device 165 (FIG. 2) raises the ring portion 353 of the lead lift assembly 350 prior to rotation of the stator 25. In order to raise the ring portion 353, the stepper motor 170 raises the lead lift plate 175 such that the lead lift plate 175 engages the three legs 358 of the lead lift assembly 350. The lead lift plate 175 then lifts the ring portion 353 via the legs 350 until the ring portion 353 is substantially flush with a top of the end windings 35 as depicted in FIG. 7a. As the ring portion 353 of the lead lift assembly 350 is raised, a portion of the leads 50 are also lifted by the ring portion 353. Once the lead lift assembly 350 is raised, rotation of the stator 25 and lacing by the lacing needle 69 begins.

Figure 7B:
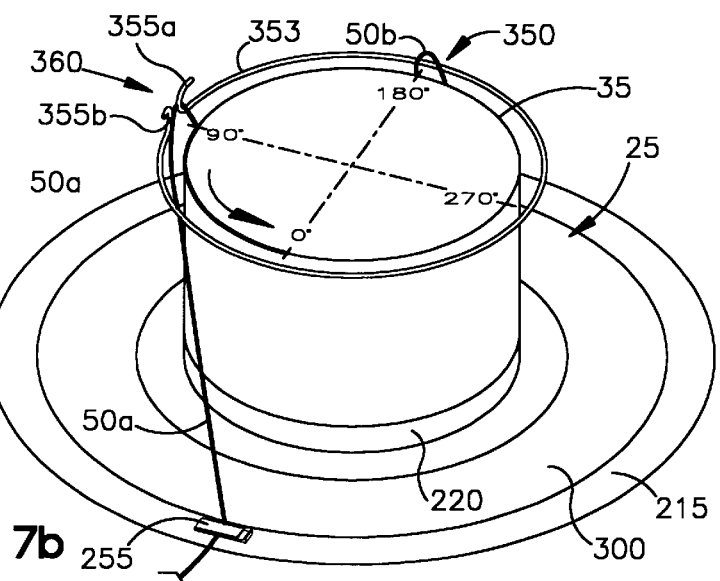
FIG. 7b is a perspective view of the stator after a 90° counter-clockwise rotation during the lacing process.

Referring now to FIG. 7b, the outer ring 215 and inner ring 220 are initially rotated 90° in a counter clockwise direction. Rotation of the outer ring 215 is accomplished by way of the bidirectional motor 135 rotating the drive gear 140 in a clockwise direction an appropriate number of revolutions. As discussed above, the gear assembly 250 provides for the outer ring to rotate the inner ring 220 an equal amount. During rotation, the lacing needle 69 is controlled via threading motor 95 and laces the end windings 35 and leads 50 which are presented to the stitch window 360. Because the stator 25 and clips 255 are rotated while the lead lift assembly 350 remains stationary, the hook 355a of the lead lift assembly 350 catches the lead 50a and positions the lead 50a in the stitch window 360 such that a portion of the lead 50a is laced to the end windings 35 as depicted by lead stitched portion 375a. The clips 255 facilitate the leads 50 remain tense during the lacing process so that the leads 50 may be properly positioned by hooks 355.

Figure 7C:
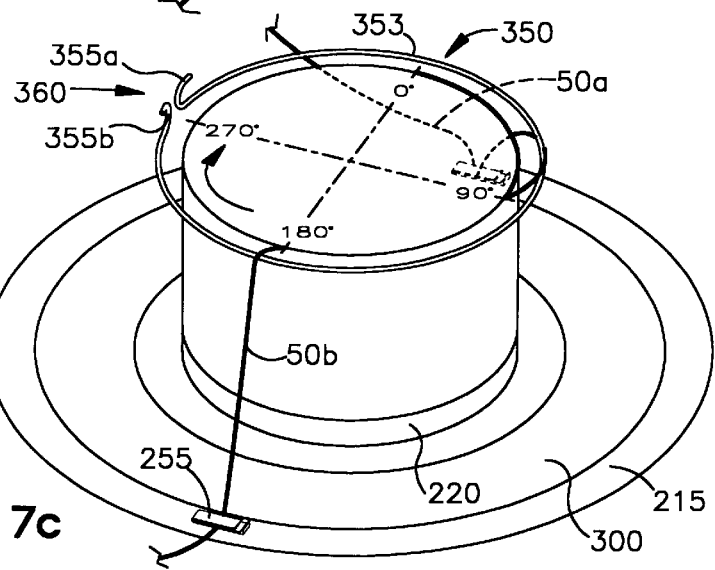
FIG. 7c is a perspective view of the stator after a 180° clockwise rotation during the lacing process.

Next, as shown in FIG. 7c, the drive gear 140 rotates the outer and inner rings 215, 220, respectively, 180° degrees in a clockwise direction. Again, during this rotation the lacing needle 69 continues to lace end windings 35 and leads 50 introduced to the stitch window 360. Thus, in this particular embodiment, the lacing needle 69 double stitches the end windings 35 and lead 50a in the region represented by lead stitched portion 375a during the first 90° clockwise rotation and then continues to lace a new portion of the end windings 35 during the remaining 90° clockwise rotation.

Figure 7D:
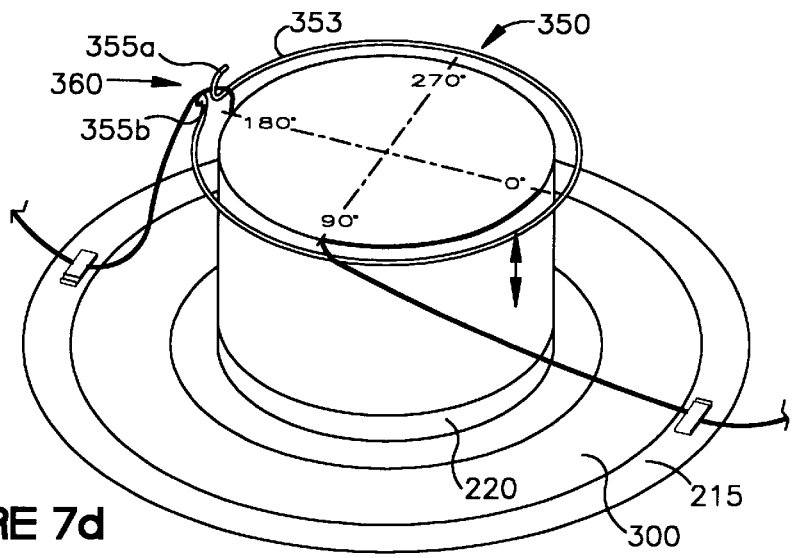
FIG. 7d is a perspective view of the stator after being reset 180° from its start point during the lacing process.

Next, as shown in FIG. 7d, the lead lift assembly 350 is lowered by the vertical positioning device 165 by virtue of the stepper motor 170 lowering the lead lift plate 175 (FIG. 2). Following lowering of the lead lift plate 175, the drive gear 140 rotates the stator 25 such that the stator 25 is rotated 180° from its initial start point in FIG. 7a. During this rotation, the lacing needle 69 is not active. Following the 180° rotation, the lead lift assembly 350 is again raised by the stepper motor 170 such that the ring portion 353 is substantially flush with the top portion of the end windings 35.

Figure 7E:
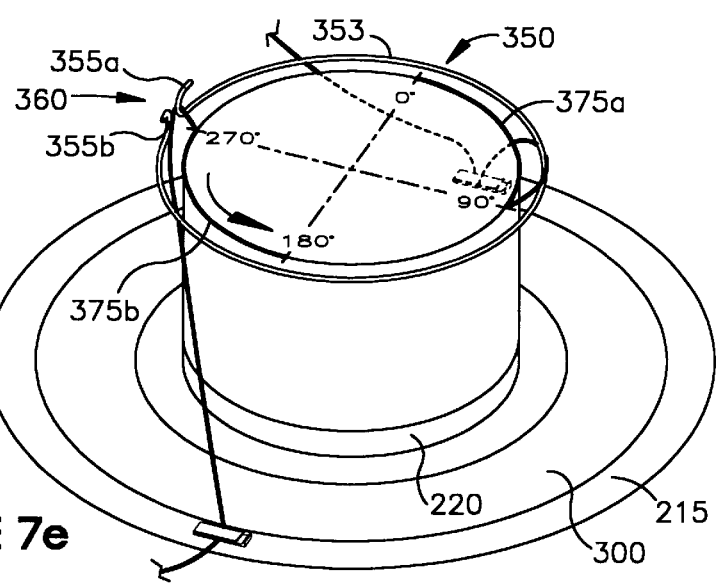
FIG. 7e is a perspective view of the stator after a 90° counter-clockwise rotation during the lacing process.
Figure 7F:
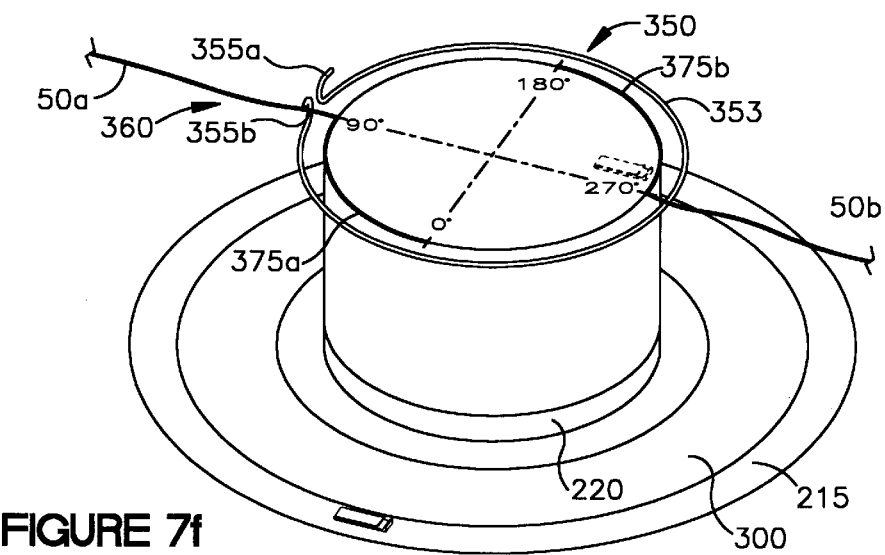
FIG. 7f is a perspective view of the stator after a 180° clockwise rotation during the lacing process.

Referring now to FIG. 7e, the drive gear 140 again rotates the outer ring 215 and inner ring 220 90° in a counterclockwise direction. During this rotation, the lacing needle 69 stitches the lead 50b to the end windings 35 along a region depicted by lead stitched portion 375b. Finally, as shown in FIG. 7f, the drive gear 140 rotates the outer ring 215 and inner ring 220 in a 180° clockwise direction. Similar to that described above with respect to FIG. 7c, during the first 90° clockwise rotation the lacing needle 69 double stitches the end windings 35 and leads 50b over the region depicted by lead stitched portion 375b. During the remaining 90° degree rotation the lacing needle 69 stitches the remaining end windings 35 introduced to the stitch window 360. Following the final 180° clockwise rotation, the lacing protocol is completed and the end windings 35 on both the upper end 38a and lower end 38b of the metal core 33 are laced about the entire 360° circumference of the metal core 33.

Figure 8:
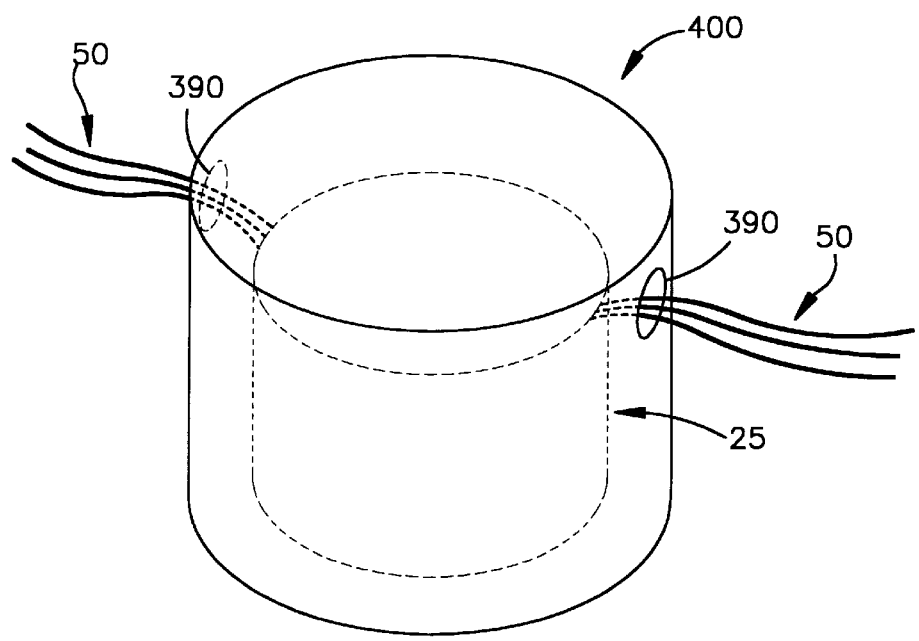
FIG. 8 is a perspective view of the stator disposed in a stator housing.

It will be appreciated that the leads 50a, 50b are laced to the end windings 35 such that each set of leads 50a, 50b departs from the stator 25 at a desired location which in the present embodiment is at opposite points along a circumference of the end windings 35. In some instances the points at which each set of leads 50a, 50b is configured to depart from the end windings 35 will correspond to one or more lead apertures 390 predefined in a stator housing 400 as shown in FIG. 8. In this manner, the leads 50 remain easily accessible to an operator after the stator 25 has been placed into its housing 400.

Following completion of the lacing protocol, the stepper motor 170 lowers the lead lift assembly 350 by lowering the lead lift plate 175. During lowering, the springs 373 (FIG. 2) also provide a downward force on the lead lift assembly 350 to facilitate proper retraction of the lead lift assembly 350. Finally, the slidable gear assembly 130 is retracted from the outer ring 220 using motor 146 and the locking pin 216 is engaged to facilitate the outer ring 215 and inner ring 220 not rotating as the pallet 28 is moved by the conveyer system 30 to the next station in the manufacturing cycle.

While the present embodiment shows a stator 25 having two sets of leads 50a and 50b, it will be appreciated that if three or more sets of leads 50 were included on the stator 25, all of the sets of leads 50 would still have departed from the stator 25 at one of the two points shown in FIG. 7f. Furthermore, by rotating the stator 25 in both clockwise and counter clockwise directions and by resetting the stator positioning as shown with respect to FIG. 7g, the present embodiment provides for a lacing technique which reduces the area in which leads 50 overlap on the end windings 35 during lacing. While overlapping of leads 50 during lacing does not affect the operations of the stator 25, it may in some instances provide the end windings 35 of the stator to have areas of higher or lower elevation thereby making it more difficult properly to fit the stator 25 in the stator housing 400.

In an alternative embodiment of the present invention, it may be desirable to lace the end windings 35 and leads 50 such that the leads 50 all depart from the stator 25 at a single point. In such a case, the lacing protocol may, for example, be set to rotate the outer ring 215 and inner ring 220 in a 360° clockwise or counter clockwise direction while the lacing needle 69 laces in the stitch window 360. Alternatively, to reduce lead 50 overlap on the end windings 35, the lacing protocol may rotate the stator 25 180° in a first direction, and then reset the stator 25 to its original position and then rotate the stator 180° in the opposite direction. Similarly, a number of other lacing protocols may alternatively be used.

In still another alternative embodiment of the present invention, it may be desired to have leads 50 depart from the stator 25 at three or more points about a circumference of the end windings 35. For example, if it were desired to have three depart points, the drive gear 140 may rotate the outer ring 215 and inner ring 220 in three 120° rotations during which lacing by lacing needle 69 is reset between each 120° rotation to provide for three lead depart points. Similarly, if four or more depart points were desired, the drive gear 140 and lacing needle 69 may be configured appropriately to rotate and to lace the end windings 35 and leads 50 as needed. It will be appreciated that the present invention is intended to cover all such lacing protocols.

The invention has been described with reference to the preferred embodiments. Obviously, modifications and alterations will occur to others upon reading and understanding the preceding detailed description. For example, while the above embodiments show the ring portion 353 of the lead lift assembly 350 to include only one pair of hooks 355 defining a single stitch window 360, it will be appreciated that the lead lift assembly 350 may include additional hooks 355 defining multiple stitch windows. Further, while the above embodiments show a single drive gear 140 to drive both the outer ring 215 and inner ring 220, it will be appreciated that separate drive gears could alternatively be used for each of the rings 215, 220. It is intended that the invention be construed as including all such modifications alterations, and equivalents thereof.

What is claimed is:

1. In a manufacturing facility having a conveyor system and a plurality of supports coupled to the conveyor system for movement of the supports to a plurality of stations in the manufacturing facility, a method comprising the steps of:

positioning a stator on one of the plurality of supports at a first station;

moving by way of the conveyor system the one support to a second station, the one support including a lead lift assembly, a first ring, and a second ring which includes at least one clip, raising the lift assembly to a predetermined height, connecting one or more leads to the at least one clip, rotating the first ring in accordance with a predefined lacing protocol, and lacing at least one of end windings and the one or more leads of the stator while positioned on the support.

2. The method of claim 1, wherein the one support is a pallet and the pallet includes a first ring rotatably disposed within the pallet and the stator is positioned on the first ring.

3. The method of claim 2, wherein the step of lacing includes the step of rotating the first ring according to a predefined lacing protocol.

4. The method of claim 1, wherein the support further includes a lead lift assembly for positioning of the leads of the stator and the method further includes the step of raising the lead lift assembly to a predetermined height prior to lacing at the second station.

5. The method of claim 4, wherein the support further includes a first ring rotatably disposed within the support and the step of lacing includes the step of rotating the first ring in accordance with a predefined lacing protocol.

6. The method of claim 1, wherein during lacing the second ring is rotated in accordance with the predefined lacing protocol.

7. The method of claim 6, wherein during lacing of the leads, at least one of a pair of hooks of the lead lift assembly positions at least a portion of the leads within a stitch window.

8. The method of claim 6 wherein the first ring and second ring are coupled by a gear assembly and the steps of rotating the first ring and second ring according to the predefined lacing protocol includes the step of engaging the second ring with a drive gear at the second station.

9. A method of lacing at least one of end windings and leads of a stator situated on a pallet, the pallet having a first ring rotatably disposed within the pallet, a vertically positionable lead lift assembly, and a second ring rotatable disposed within the pallet, the seond ring including at least one clip for releasably securing the leads of the stator, the method comprising the steps of:

placing the stator on the first ring of the pallet;

raising the lead lift assembly to a predetermined height, the lead lift assembly having a ring portion for positioning the leads of the stator during a lacing step, the ring portion including a pair of spaced apart hooks defining a stitch window through which lacing takes place; rotating the first ring according to a predefined lacing protocol;

positioning in the stitch window by at least one of the hooks a portion of at least one lead during rotation of the first ring;

connecting the at least one lead to the at least one clip; and lacing at least one of the end windings and the leads during at least a portion of the rotation of the first ring.

10. The method of claim 9, wherein the pallet further includes a vertically positionable lead lift assembly, the lead lift assembly having a ring portion for positioning the leads of the stator during lacing, the method further including the step of raising the lead lift assembly to a predetermined height prior to lacing.

11. The method of claim 10, wherein the ring portion of the lead lift assembly includes a pair of spaced apart hooks defining a stitch window through which lacing takes place, the method further including the step of positioning in the stitch window by at least one of the hooks a portion of at least one lead during rotation of the first ring.

12. The method of claim 11, further comprising the step of:

rotating the second ring at substantially the same rotational speed and direction as the first ring.

13. A method for lacing leads of a stator comprising the steps of:

supporting the stator with a pallet, the pallet having first and second rings rotatably disposed therein, and a lead lift assembly;

using the first ring to facilitate supporting the stator;

securing the leads to the second ring;

raising the lead lift assembly to a predetermined height to position the leads for lacing;

selectively rotating the first and second rings according to a predefined lacing protocol; and lacing the leads.

14. A method for lacing leads of a stator comprising the steps of:

supporting the stator with a pallet, the pallet having inner and outer rings rotatably disposed therein, and a lead lift assembly;

using the inner ring to facilitate supporting the stator;

securing one end of the leads to the outer ring;

raising the lead lift assembly to a predetermined height to position the leads for lacing;

selectively rotating the inner and outer rings according to a predefined lacing protocol; and lacing the leads.

15. A method for lacing leads of a stator comprising the steps of:

supporting the stator with a pallet, the pallet having inner and outer rings rotatably disposed therein and means for lifting the leads;

using the inner ring to facilitate supporting the stator;

securing one end of the leads to the outer ring;

using the means for lifting the leads to vertically positioning the leads to a position suitable for lacing thereof;

selectively rotating the inner and outer rings according to a predefined lacing protocol; and lacing the leads.

* * * * *